United States Patent
Hua et al.

(10) Patent No.: US 12,273,288 B2
(45) Date of Patent: Apr. 8, 2025

(54) SEQUENCE GENERATION METHOD AND DEVICE, AND STORAGE MEDIUM

(71) Applicant: ZTE Corporation, Shenzhen (CN)

(72) Inventors: Jian Hua, Shenzhen (CN); Yu Xin, Shenzhen (CN); Jun Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 538 days.

(21) Appl. No.: 17/641,944

(22) PCT Filed: Jul. 21, 2020

(86) PCT No.: PCT/CN2020/103195
§ 371 (c)(1),
(2) Date: Apr. 15, 2022

(87) PCT Pub. No.: WO2021/047291
PCT Pub. Date: Mar. 18, 2021

(65) Prior Publication Data
US 2022/0360391 A1    Nov. 10, 2022

(30) Foreign Application Priority Data
Sep. 10, 2019   (CN) .......................... 201910854925.5

(51) Int. Cl.
*H04L 5/00*      (2006.01)
*H04L 27/26*     (2006.01)

(52) U.S. Cl.
CPC ........ *H04L 5/0048* (2013.01); *H04L 27/2605* (2013.01); *H04L 27/2614* (2013.01)

(58) Field of Classification Search
CPC ............... H04L 5/0048; H04L 27/2605; H04L 27/2614; H04L 27/2078; H04L 27/2636;
(Continued)

(56) References Cited

U.S. PATENT DOCUMENTS 9,042,481 B2    5/2015  Ozaki et al.
2007/0071125 A1    3/2007  Tan et al.
(Continued)

FOREIGN PATENT DOCUMENTS

CN    106878213 A    6/2017
CN    108809586 A    11/2018
(Continued)

OTHER PUBLICATIONS

Low PAPR Modulation Design for NR UL (Year: 2017).*
(Continued)

*Primary Examiner* — Michael A Keller
*Assistant Examiner* — Thao D Duong
(74) *Attorney, Agent, or Firm* — Wolf, Greenfield & Sacks, P.C.

(57) ABSTRACT

Disclosed are a sequence generation method, a sequence generation apparatus and a non-transitory computer-readable storage medium. The sequence generation method may include generating a first sequence according to a pre-generated random sequence, and using the first sequence as a reference signal sequence. The first sequence has a plurality of elements which are all in a form of complex numbers and have a same modulus value, a phase difference between two adjacent elements is less than $\pi/2$, and the modulus value is an amplitude value indicating signal strength.

20 Claims, 4 Drawing Sheets

(58) Field of Classification Search
CPC ............... H04L 27/2613; H04L 27/261; H04L 27/2615; H04L 5/0051; Y02D 30/70
See application file for complete search history.

(56) References Cited

U.S. PATENT DOCUMENTS

| | | |
|---|---|---|
| 2010/0165829 A1 | 7/2010 | Narasimha et al. |
| 2015/0118969 A1* | 4/2015 | Chen ..................... H04B 17/20 455/67.11 |
| 2019/0081840 A1* | 3/2019 | Park ..................... H04L 27/2636 |
| 2019/0090201 A1 | 3/2019 | Akkarakaran |
| 2020/0287762 A1* | 9/2020 | Qu ....................... H04L 27/2614 |
| 2021/0328842 A1* | 10/2021 | Liu ....................... H04L 27/2613 |
| 2022/0104254 A1* | 3/2022 | Matsumura ......... H04W 74/0808 |
| 2022/0381904 A1* | 12/2022 | Trandem ................ H04B 11/00 |

FOREIGN PATENT DOCUMENTS

| | | |
|---|---|---|
| CN | 111092838 A | 5/2020 |
| EP | 3 829 125 A1 | 6/2021 |
| WO | WO 2017/078607 A1 | 5/2017 |

OTHER PUBLICATIONS

Extended European Search Report for European Application No. 20862579.8, dated Sep. 22, 2023.
[No Author Listed] 3GPP Tsg Ran WG1 Meeting #88, Agenda Item 8.1.5: Low PAPR Modulation Design for NR UL. MediaTek. Feb. 17, 2017:1-7.
International Search Report and Written Opinion for International Application No. PCT/CN2020/103195, mailed Oct. 26, 2020.
[No Author Listed] 3GPP TSG RAN WG1 Meeting #86bis R1-1609078. Samsung. Low PAPR Modulation and Waveform. Oct. 14, 2016:1-3.
[No Author Listed], 3GPP TSG RAN WG1 Meeting #96bis R1-1903897. Low PAPR Reference Signals. IITH. Apr. 12, 2019:1-8.

* cited by examiner

FIG. 9

SEQUENCE GENERATION METHOD AND DEVICE, AND STORAGE MEDIUM

CROSS REFERENCE TO RELATED APPLICATIONS

This application is a national stage filing under 35 U.S.C. § 371 of international application number PCT/CN2020/103195, filed Jul. 21, 2020, which claims priority to Chinese patent application No. 201910854925.5, filed Sep. 10, 2019. The contents of these applications are incorporated herein by reference in their entirety.

TECHNICAL FIELD

The present disclosure relates to a wireless communication network, for example, to a sequence generation method, a sequence generation apparatus and a non-transitory computer-readable storage medium.

BACKGROUND

In high-frequency scenarios, due to high path loss and shadow fading, the signal-to-noise ratio will be very low in some areas at the edge of the cell. In addition, in high-frequency scenarios, Power Amplifiers (PAs) are relatively low in efficiency. In order to improve the signal-to-noise ratio and save the power consumption of batteries of User Equipment (UE), the Peak to Average Power Ratio (PAPR) of signals transmitted by UEs should be as low as possible. Therefore, how to configure low-PAPR reference signal sequences is a problem to be solved urgently.

SUMMARY

According to embodiments of the present disclosure, a sequence generation method, a sequence generation apparatus and a non-transitory computer-readable storage medium are provided, for effective PAPR reduction in reference signal sequences.

According to an embodiment of the present disclosure, provided is a sequence generation method. The method may include: generating a first sequence according to a pre-generated random sequence; and using the first sequence as a reference signal sequence. A plurality of elements in the first sequence are all in the form of complex numbers and have the same modulus value, a phase difference between any two adjacent elements is less than $\pi/2$, and the modulus value is an amplitude value used to indicate signal strength.

According to an embodiment of the present disclosure, provided is a sequence generation apparatus. The apparatus may include: a generation module and a determination module. The generation module is configured to generate a first sequence according to a pre-generated random sequence. The determination module is configured to use the first sequence as a reference signal sequence. A plurality of elements in the first sequence are all in the form of complex numbers and have the same modulus value, a phase difference between any two adjacent elements is less than $\pi/2$, and the modulus value is an amplitude value used to indicate signal strength.

According to an embodiment of the present disclosure, provided is a non-transitory computer-readable storage medium having computer programs stored thereon which, when executed by a processor, cause the processor to carry out the sequence generation method described in the above embodiments.

DETAILED DESCRIPTION

The embodiments of the present disclosure will be described below with reference to the accompanying drawings.

In the New Radio (NR), in order to transmit signals with lower PAPR, Discrete Fourier Transform spread. Orthogonal Frequency Division Multiplexing (DFT-s-OFDM) waveform may be selected. Since the data of DFT-s-OFDM waveform is mapped in time domain, the PAPR will be lower than that in Cyclic Prefix-Orthogonal Frequency Division Multiplexing (CP-OFDM). The PAPR can be reduced by selecting Zadoff-Chu sequences (i.e., ZC sequences) or ½π Binary Phase Shift Keying (BPSK) sequences for reference signals. However, the ZC sequences or ½π BRPSK sequences are still relatively high in PAPR. Thus, other sequences may be used to obtain an even lower PAPR, to satisfy the application scenarios requiring lower PAPR in the 5th Generation mobile communication system (5G) or 6G, for example, when the reference signal sequence has a high overhead.

An embodiment of the present disclosure provides a sequence generation method, so as to provide a reference signal sequence with a lower PAPR.

Figure 1:
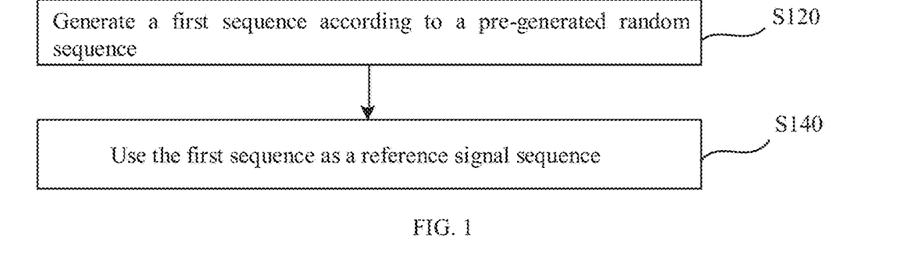
FIG. 1 is a flowchart of a method for transmitting feedback information according to an embodiment of the present disclosure.

FIG. 1 is a flowchart of a sequence generation method according to an embodiment of the present disclosure. This embodiment may be applied to a situation of generating a reference signal sequence with a lower PAPR, and may be executed by a base station or a UE.

As shown in FIG. 1, the method provided in this embodiment includes steps S120 to S140.

At S120, a first sequence is generated according to a pre-generated random sequence.

At S140, the first sequence is used as a reference signal sequence.

A plurality of elements in the first sequence are all in the form of complex numbers and have the same modulus value, a phase difference between any two adjacent elements is less than π/2, and the modulus value is an amplitude value used to indicate signal strength.

In the embodiment, a random sequence may be pre-generated, and then a first sequence is generated according to the random sequence and used as a reference signal sequence. The random sequence may be a pseudorandom sequence. In an embodiment, a plurality of elements in the first sequence have the same modulus value, which can reduce the PAPR of signals after oversampling the reference signal sequence in DFT-s-OFDM. The modulus value of each element refers to an amplitude value of the signal, which is a parameter used to indicate signal strength.

In an embodiment, the phase difference between any two adjacent elements in the first sequence is less than π/2. For example, the phase difference between any two adjacent elements in the first sequence is π/4 or smaller. In the embodiment, compared with a π/2 BPSK sequence, the phase difference between any two adjacent elements in the first sequence is smaller, so that the PAPR of the reference signal can be reduced.

In an embodiment, the phase difference between a first element and a last element in the first sequence is less than π/2. In an embodiment, the phase difference between the first element and the last element in the first sequence is π/4 or smaller. In the embodiment, the phase difference between the first element and the last element in the first sequence being π/4 allows a head and a tail of the first sequence to be connected, and the PAPR of the oversampled signal can be lower.

In an embodiment, the first sequence includes an odd bit sequence and an even bit sequence, where the phase difference between any two adjacent elements in the odd bit sequence is π/2, and the phase difference between any two adjacent elements in the even bit sequence is π/2 or 0. In the embodiment by splitting the first sequence into an odd bit sequence and an even bit sequence and defining the phase of each element in the odd bit sequence and the even bit sequence, it is convenient for the generation of the first sequence, and the generated first sequence has enough randomness and relatively stable power in frequency domain.

In an embodiment, the odd bit sequence is a ½π BPSK sequence. In the embodiment, the odd bit sequence is set as a ½π BPSK sequence to facilitate the generation of the first sequence, and to make the first sequence has enough randomness.

In an embodiment, in a case where a current element is included in a first element set, a phase average of two elements adjacent to the current element is used as the phase of the current element. The first element set includes all elements other than a last element in the even bit sequence. In an embodiment, a phase average of a penultimate element and the first element in the first sequence is used as the phase of the last element in the even bit sequence. In this embodiment, the phase of all elements other than the last element in the even bit sequence can be calculated from a phase average of two elements adjacent to this element in the first sequence, and the phase of the last element in the even bit sequence can be calculated from a phase average of the penultimate element and the first element in the first sequence. The even bit sequence generated on the basis of the odd bit sequence can satisfy that the phase difference between adjacent elements in the first sequence is ¼π, and the PAPR can thus be reduced.

In an embodiment, in a case where the current element is included in a second element set, if the phase of a previous odd bit element adjacent to the current element is ¾π, the phase of the current element is adjusted as π. The second element set includes all elements having a phase of 0 in the even bit sequence. In the embodiment, for an element having a phase of 0 in the even bit sequence, if the phase of a previous odd bit element adjacent to this element is ¾π, the phase of elements in the even bit sequence is adjusted as π, so that phase interpolation errors can be corrected.

In an embodiment, each element in the first sequence has a modulus value of 1. In the embodiment, setting the modulus value of each element in the first sequence as 1 is to facilitate power normalization.

In an embodiment, the phase of each element in the first sequence includes −¾π, −½π, −¼π, 0, ¼π, ½π, ¾π or π.

In an embodiment, a way of determining the phase of each element in the even bit sequence includes: obtaining the phase of the current element by rotating a previous odd bit element adjacent to the current element by ¼π or −¼π, the phase of the current element satisfying that the phase difference between the current element and a next odd bit element adjacent to the current element is ¼π. In the embodiment, the phase of each element in the even bit sequence can be obtained by rotating a previous odd bit element by ¼π or −¼π, where the rotated element satisfies the condition that the phase difference between the rotated element and a next odd bit element adjacent to the element is ¼π.

In an embodiment, the generating a first sequence according to a pre-generated random sequence includes: a relation between the first sequence d(n) and the random sequence b(m) is:

$$d(n) = \frac{\exp\left(j\frac{\pi}{2}(i \bmod 2)\right)}{\sqrt{2}} [(1 - 2b(i)) + j(1 - 2b(i))]^*$$

$$\exp\left(j\frac{\pi}{4}((n+1)\bmod 2)(2eq(b(i), b(i+1)) - 1)(1 - 2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal. eq. (b(i),b(i+1)) means that the eq function has a result of 1 when b(i) and b(i+1) are equal, and a result of 0 when b(i) and b(i+1) are not equal.

In the embodiment, in a case where the first sequence d(n) is obtained through the relation between the first sequence d(n) and the random sequence b(m), N=2M, and additionally, b(M+1)=b(1), so that the head and tail of the first sequence are connected, and the PPR after oversampling the reference signal corresponding to the first sequence is lower.

In an embodiment, the generating a first sequence according to a pre-generated random sequence includes:
generating an odd bit sequence according to the pre-generated random sequence; generating an even bit sequence according to the odd bit sequence; and, generating the first sequence according to the odd bit sequence and the even bit sequence.

In an embodiment, the generating an odd bit sequence according to the pre-generated random sequence includes: the relation between the odd bit sequence d1(m) and the random sequence b(m) is:

$$d1(m) = \frac{e^{j\frac{\pi}{2}(m\bmod 2)}}{\sqrt{2}}[(1-2b(m)) + j(1-2b(m))],$$

where m=1, 2, 3, . . . , M, mod is a mod function, and j denotes the imaginary part of the complex number.

In an embodiment, the generating an even bit sequence according to the odd bit sequence includes: the modulus value of each element in the even bit sequence is the same as that of each element in the odd bit sequence; and, the phase of the current element in the even bit sequence is a phase average of two elements adjacent to the current element in the odd bit sequence.

In an embodiment, the generating the first sequence according to the even bit sequence includes: sequentially interpolating one element, that is sequentially arranged in the even bit sequence, between two adjacent elements in the odd bit sequence.

In the embodiment, the odd bit sequence d1(m) may be generated through the relation between the odd bit sequence d1(m) and the random sequence b(m), Then, the modulus value of each element in the even bit sequence is configured to be the same as that of each element in the odd bit sequence, and the phase of the current element in the even bit sequence is set to be the phase average of two elements adjacent to the current element in the odd bit sequence. Finally, the odd bit sequence is placed at odd bits of the first sequence, and the even bit sequence is placed at even bits of the first sequence. For the elements in the even bit sequence having a phase of 0, if an absolute value of elements, that have the same sequential numbers as the elements having a phase of 0 in the even bit sequence, in the odd bit sequence added by one element is ¼π, the phase of the elements having a phase of 0 in the even bit sequence is changed into π.

In an embodiment, the random sequence includes a pseudorandom sequence (i.e., a Pseudo Noise (PN) sequence), a Gold sequence or an m sequence. In the embodiment, the random sequence may be a pseudorandom sequence, a Gold sequence or an m sequence, so that the phase of the reference signal corresponding to the generated reference signal sequence has enough randomness and relatively stable power in frequency domain.

In an embodiment, the odd bit sequence d1(m) can be generated according to the relation between the odd bit sequence d1(m) and the random sequence b(m). In the embodiment, the sequence b(m) is known, m=1, 2, 3, . . . , M and b(m) is a pseudorandom sequence (e.g., a PN sequence, a Gold sequence or an m sequence) having a length of M, the corresponding d1(m) can be obtained according to the relation between d1(m) and b(m). The relation between d1(m) and b(m) may be:

$$d1(m) = \frac{e^{j\frac{\pi}{2}(m\bmod 2)}}{\sqrt{2}}[(1-2b(m)) + j(1-2b(m))].$$

After the odd bit sequence d1(m) is obtained, one element is added in the odd bit sequence d1(m) to obtain a sequence d1'(m'), where m'=1, 2, 3, . . . , M+1). It is assumed that d1'(m)=d1(m) (where m=1, 2, 3, . . . ,M) and d1'(M+1)=d1(1). The odd bit sequence d2(m) is interpolated between two adjacent elements in the sequence d1'(m') where the conditions that the modulus value of the even bit sequence d2(m) is the same as that of d1'(m') and the phase of d2(m) is the phase average of d1'(m) and d1'(m+1). If the phase of d2(m) is 0 and the absolute value of the phase of d1'(m) is ¼π, the phase of d2(m) is changed into π. Then, the sequence d1(m) is placed at odd bits of the first sequence d(n), and the sequence d2(m) is placed at even bits of the first sequence d(n), where n=1, 2, 3, . . . , N and N=2M. The first sequence d(n) is a reference signal sequence having a length of N, and thus has a lower PAPR.

Figure 2:
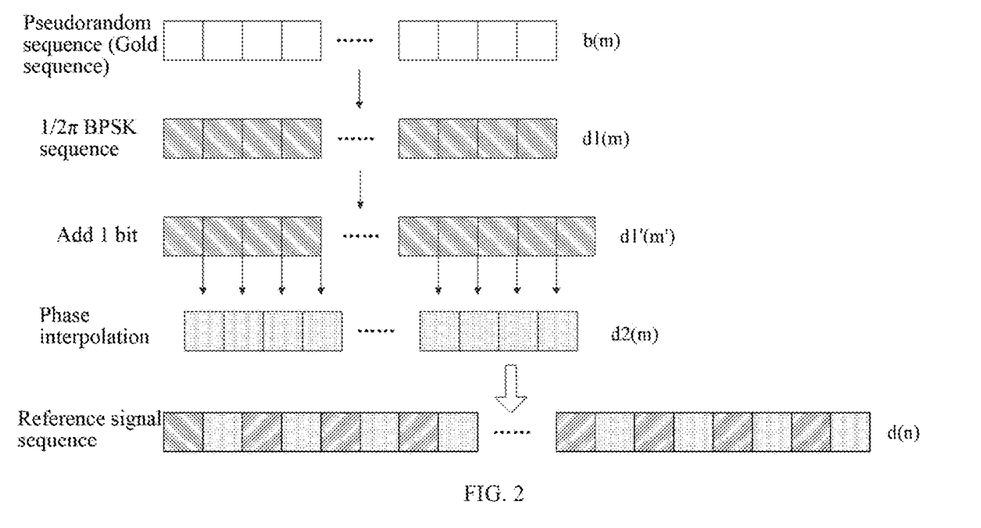
FIG. 2 is a schematic diagram of generation of a reference signal sequence according to an embodiment of the present disclosure.

FIG. 2 is a schematic diagram of generation of a reference signal sequence according to an embodiment of the present disclosure. As shown in FIG. 2, the adopted random sequence is a Gold sequence denoted by b(m), and the corresponding d1(m) is obtained according to the relation between d1(m) and b(m). For example, d1(m) is a ½π BPSK sequence. d1(m) is added by one bit to obtain d1'(m'). The modulus value and phase of the corresponding element in the even bit sequence are obtained based on the modulus value and phase of each element in the odd bit sequence, that is, the even bit sequence d2(m) is obtained. The even bit sequence is interpolated into the odd bit sequence to obtain a first sequence d(n), i.e., a reference signal sequence d(n).

In an embodiment, the first sequence d(n) can be generated according to the relation between the first sequence d(n) and the random sequence b(m). In the embodiment, the sequence b(m) is known, m=1, 2, 3, . . . , M, and b(m) is a random sequence (e.g., a PN sequence, a Gold sequence or an m sequence) having a length of M. One element is added in the sequence b(m) to obtain a sequence b'(m'), where m'=1, 2, 3, . . . , M+1. If it is assumed that b'(m)=b(m) (where m=1, 2, 3, . . . , M) and b'(M+1=b(1), the corresponding d(n) can be obtained according to the relation between d(n) and b(m). The relation between d(n) and b(m) may be:

$$d(n) = \frac{\exp\left(j\frac{\pi}{2}(i\bmod 2)\right)}{\sqrt{2}}[(1-2b(i)) + j(1-2b(i))]^*$$

$$\exp\left(j\frac{\pi}{4}((n+1)\bmod 2)(2eq(b(i), b(i+1))-1)(1-2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal. In the embodiment, the first sequence d(n) is a reference signal sequence having a length of N and thus has a lower PAPR.

Figure 3:
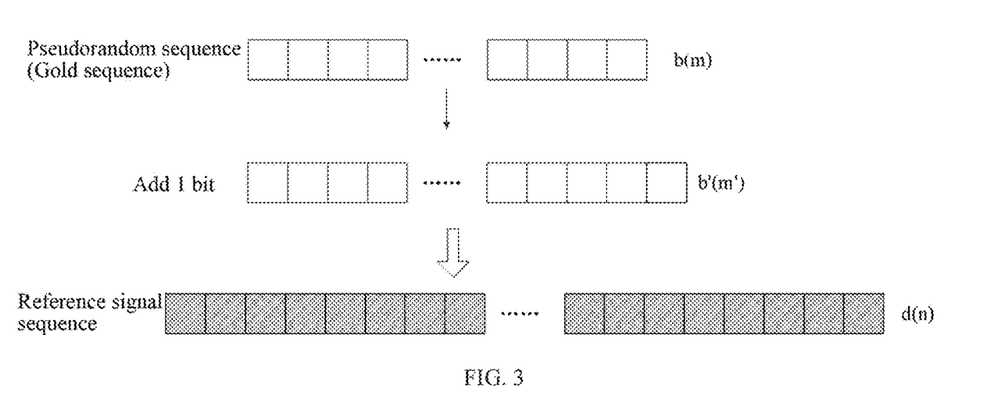
FIG. 3 is a schematic diagram of generation of another reference signal sequence according to an embodiment of the present disclosure.

FIG. 3 is a schematic diagram of generation of another reference signal sequence according to an embodiment of the present disclosure. As shown in FIG. 3, the adopted random sequence is a Gold sequence denoted by b(m), b(m) is added by one bit to obtain corresponding b'(m'), and a first sequence d(n) (i.e., a reference signal sequence d(n)) is obtained according to a relation between d(n) and b(m).

In an embodiment, the reference signal sequence includes a Demodulation Reference Signal (DMRS) sequence, a Phase-Tracking Reference Signal (PTRS) sequence or a Sounding Reference Signal (SRS) sequence.

In an embodiment, in a case where the reference signal sequence is a DMRS sequence, the sequence generation method further includes: performing discrete Fourier transform on the first sequence to obtain a DMRS frequency-domain sequence.

In an embodiment, the first sequence may be used as a DMRS sequence. In the embodiment, the sequence b(m) is known, m=1, 2, 3, . . . , M, and b(m) is a random sequence (e.g., a PN sequence, a Gold sequence or an m sequence) having a length of M. One element is added in the sequence b(m) to obtain a sequence b'(m'), where m'=1, 2, 3, . . . , M+1. If it is assumed that b'(m)=b(m) (where m=1, 2, 3, . . . , M) and b'(M+1)=b(1), the corresponding d(n) can be obtained according to the relation between b(m) and d(n). The relation between d(n) and b(m) may be:

$$d(n) = \frac{\exp\left(j\frac{\pi}{2}(i\bmod 2)\right)}{\sqrt{2}}[(1-2b(i)) + j(1-2b(i))]^*$$

$$\exp\left(j\frac{\pi}{4}((n+1)\bmod 2)(2eq(b(i),b(i+1))-1)(1-2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and h are equal and a result of 0 when a and b are not equal.

The first sequence d(n) is a reference signal sequence having a length of N. If the reference signal sequence is a DMRS sequence, Discrete Fourier Transform (DFT) is performed on the first sequence d(n) to obtain a DMRS frequency-domain sequence. The DMRS frequency-domain sequence is placed in a time-frequency resource where the DMRS of DFT-s-OFDM is located, and transmitted as DMRS, thereby realizing a lower PAPR.

Figure 4:
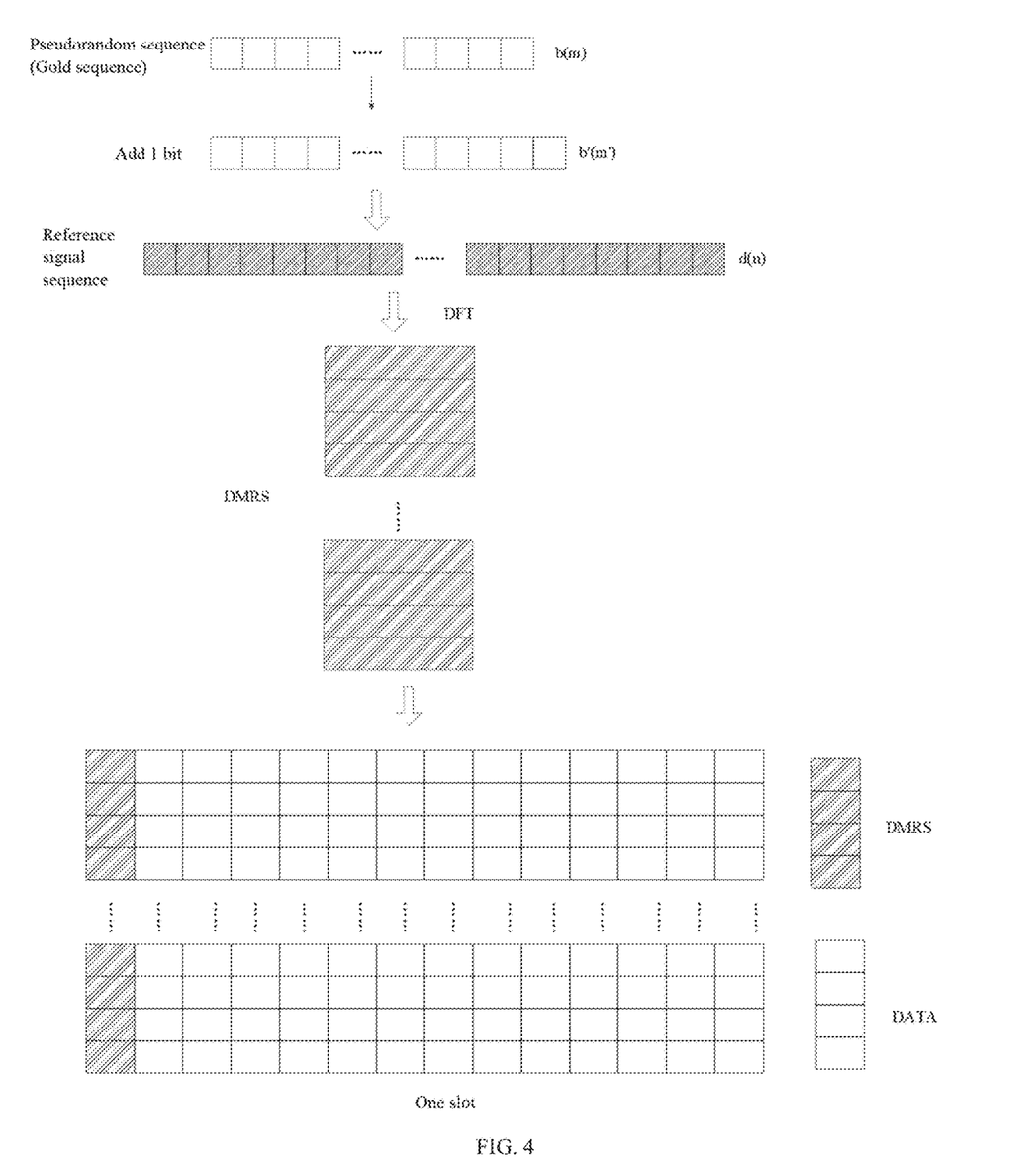
FIG. 4 is a schematic diagram of generation of a DMRS sequence according to an embodiment of the present disclosure.

FIG. 4 is a schematic diagram of generation of a DMRS sequence according to an embodiment of the present disclosure. As shown in FIG. 4, the adopted random sequence is a Gold sequence denoted by b(m), b(m) is added by one bit to obtain b'(m'), and a first sequence d(n) (i.e., a reference signal sequence d(n)) is obtained according to a relation between d(n) and b(m). DFT is performed on the generated d(n) to obtain a DMRS frequency-domain sequence which is then placed in a time-frequency resource where the DMRS of DTF-S-OFDM is located and transmitted as DMRS. In the embodiment, by taking one slot as an example, the DMRS frequency-domain sequence is placed in a time-frequency resource where the DIMS of DTF-S-OFDM is located and transmitted as DMRS.

In an embodiment, the first sequence may be used as a PTRS sequence. In the embodiment, the sequence b1($m$) is known, m=1,2,3, . . . M, and b1($m$) and b2($m$) are pseudo-random sequences (e.g., PN sequences, Gold sequences or m sequences) having a length of M. One element is added in the sequence b1($m$) and the sequence b2($m$) to obtain sequences b1'($m'$) and b1'($m'$), where m=1, 2, 3, . . . , M+1. If it is assumed that b1'($m'$)=b1($m$) (where m=1, 2, 3, . . . , M), b1'(M+1)=b1(1), b2'($m$)=b2($m$) (where m=1,2,3, . . . M) and b2'(M+1)=b2(1), corresponding d1($n$) and d2($n$) can be obtained according to a relation between d(n) and b(m). The relation between d(n) and b(m) may be:

$$d(n) = \frac{\exp\left(j\frac{\pi}{2}(i\bmod 2)\right)}{\sqrt{2}}[(1-2b(i)) + j(1-2b(i))]^*$$

$$\exp\left(j\frac{\pi}{4}((n+1)\bmod 2)(2eq(b(i),b(i+1))-1)(1-2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal.

The generated sequences d1($n$) and d2($n$) are used as PTRS sequences, and the PTRS sequences are placed at two ends of an OFDM symbol before one DFT of DFT-s-OFDM and transmitted as PTRS, so that the PAPR is lower.

Figure 5:
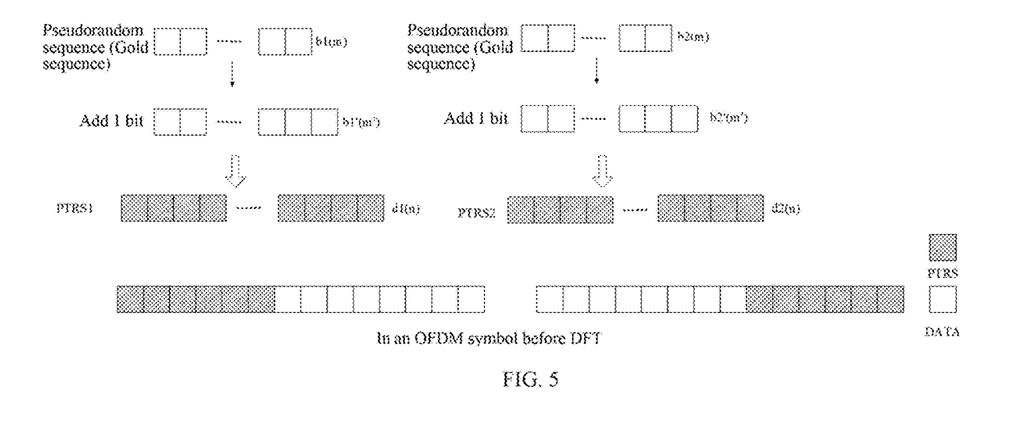
FIG. 5 is a schematic diagram of generation of a PTRS sequence according to an embodiment of the present disclosure.

FIG. 5 is a schematic diagram of generation of a PTRS sequence according to an embodiment of the present disclosure. As shown in FIG. 5, the adopted random sequences are Gold sequences denoted by b1($m$) and b2($m$), b1($m$) and b2($m$) are added by one bit, respectively, to obtain corresponding b1'($m'$) and b1'($m'$), and first sequences d1($n$) and d2($n$) (i.e., a reference signal PTRS1 denoted by d1($n$) and a reference signal PTRS2 denoted by d2($n$)) are obtained according to a relation between d(n) and b(m). In an embodiment, d1($n$) and d2($n$) can be placed at two ends (i.e., head and tail) of an OFDM symbol before one DFT of DFT-s-OFDM and transmitted as PTRS, thereby realizing a lower PAPR.

In an embodiment, in a case where the reference signal sequence is an SRS sequence, the sequence generation method further includes: performing discrete Fourier transform on the first sequence to obtain an SRS frequency-domain sequence.

In an embodiment, the first sequence can be used as an SRS sequence. In the embodiment, the sequence b(m) is known, m=1, 2, 3, . . . , M, and b(m) is a random sequence (e.g., a PN sequence, a Gold sequence or an m sequence) having a length of M. One element is added in the sequence b(m) to obtain a sequence b'(m'), where m'=1, 2, 3, . . . , M+1. If it is assumed that b'(m)=b(m) (where m=1, 2, 3, . . . , M) and b'(M+1)=b(1), the corresponding d(n) can be obtained according to the relation between b(m) and d(n). The relation between d(n) and b(m) may be:

$$d(n) = \frac{\exp\left(j\frac{\pi}{2}(i\bmod 2)\right)}{\sqrt{2}}[(1-2b(i)) + j(1-2b(i))]^*$$

$$\exp\left(j\frac{\pi}{4}((n+1)\bmod 2)(2eq(b(i),b(i+1))-1)(1-2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal.

The first sequence d(n) is a reference signal sequence having a length of N. If the reference signal sequence is an SRS sequence, DFT is performed on the first sequence d(n) to obtain an SRS frequency-domain sequence. The SRS frequency-domain sequence is placed in a time-frequency resource where the SRS of DFT-s-OFDM is located, and transmitted as SRS, thereby realizing a lower PAPR.

Figure 6:
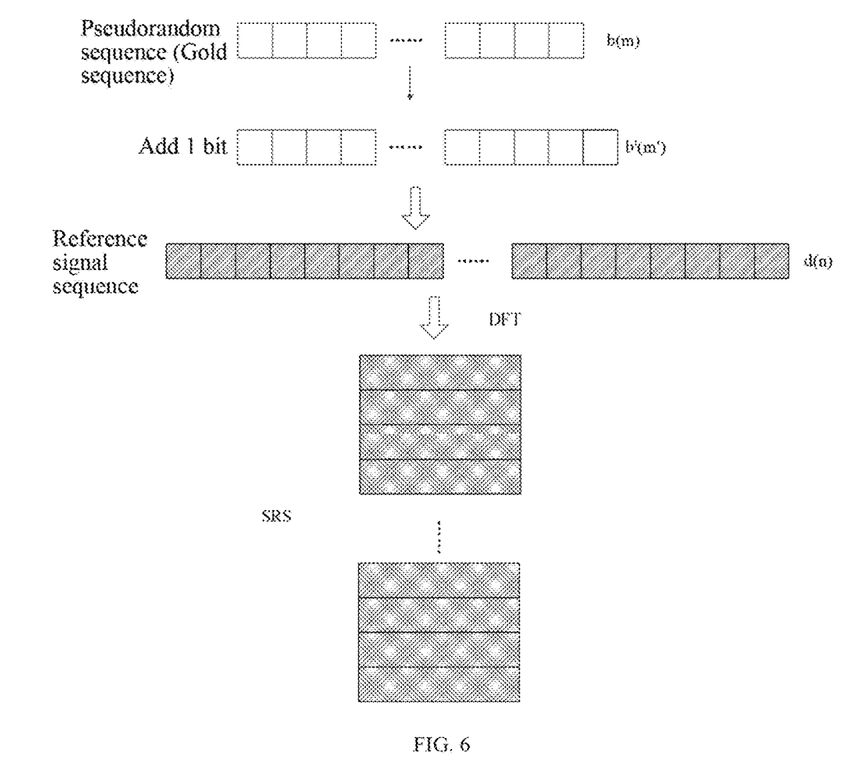
FIG. 6 is a schematic diagram of generation of an SRS sequence according to an embodiment of the present disclosure.

FIG. 6 is a schematic diagram of generation of an SRS sequence according to an embodiment of the present disclosure. As shown in FIG. 6, the adopted random sequence is a Gold sequence denoted by b(m), b(m) is added by one bit to obtain corresponding b'(m'), and a first sequence d(n) (i.e., a reference signal sequence d(n)) is obtained according to the relation between d(n) and b(m). DFT is performed on the generated d(n) to obtain an SRS frequency-domain sequence, and the SRS time-frequency sequence is placed in a time-frequency resource where the SRS of DTF-S-OFDM is located and transmitted as SRS.

In an embodiment, the sequence generation method further includes: using the first sequence as a guard interval (GI) sequence. In the embodiment, the first sequence may also be used as a GI sequence or other known sequences. In an embodiment, the using the first sequence as a GI sequence includes: placing the first sequence at a front end of an OFDM symbol before one DFT of DFT-s-OFDM to serve as the GI sequence.

In an embodiment, the first sequence is used as a GI sequence. In the embodiment, the sequence b1(m) is known, m=1, 2, 3, . . . , M, and b1(m) is a random sequence (e.g., a PN sequence, a Gold sequence or an m sequence) having a length of M. One element is added in the sequence b1(m) to obtain a sequence b1'(m'), where m'=1, 2, 3, . . . , M+1. If it is assumed that b1'(m)=b1(m) (where m=1, 2, 3, . . . , M) and b1'(M+1)=b1(1), the corresponding d(n) can be obtained according to a relation between b(m) and d1(n). The relation between d(n) and b(m) may be:

$$d(n) = \frac{\exp\left(j\frac{\pi}{2}(i \bmod 2)\right)}{\sqrt{2}}[(1-2b(i)) + j(1-2b(i))]^*$$
$$\exp\left(j\frac{\pi}{4}((n+1) \bmod 2)(2eq(b(i), b(i+1)) - 1)(1 - 2(i \bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal.

The generated sequence d1(n) is used as a GI sequence, and the GI sequence is placed at a front end of an OFDM symbol before one DFT of DFT-s-OFDM and transmitted as GI, thereby realizing a PAPR.

Figure 7:
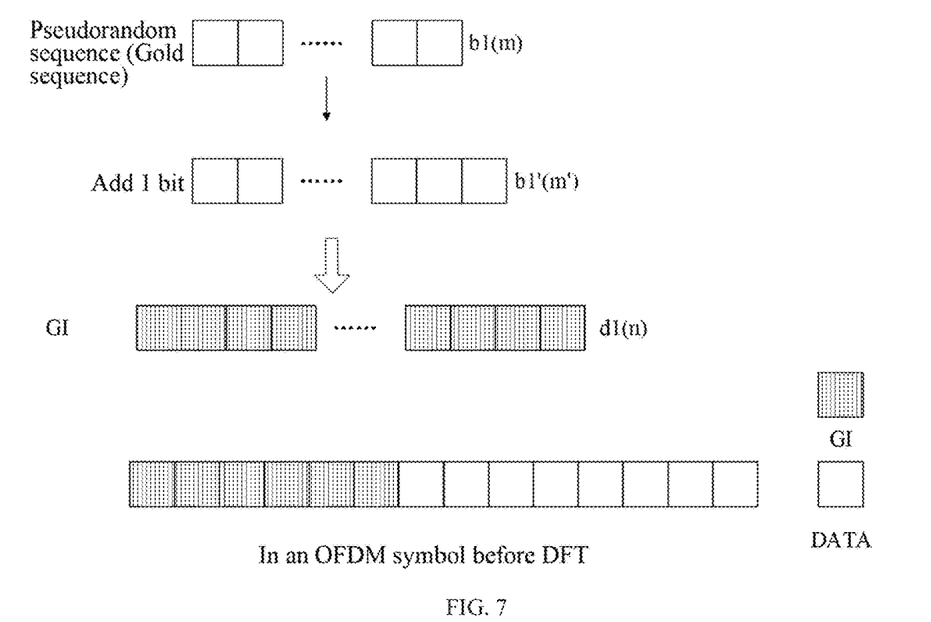
FIG. 7 is a schematic diagram of generation of a GI sequence according to an embodiment of the present disclosure.

FIG. 7 is a schematic diagram of generation of a GI sequence according to an embodiment of the present disclosure. As shown in FIG. 7, the adopted random sequence is a Gold sequence denoted by b1(m), b1(m) is added by one bit to obtain b1'(m'), and a first sequence d1(n) (i.e., a GI sequence) is obtained according to a relation between d(n) and b(m). In an embodiment, d1(n) may be placed at a front end (i.e., head) of an OFDM symbol before one DFT of DFT-s-OFDM and transmitted as GI, thereby realizing a lower PAPR.

Figure 8:
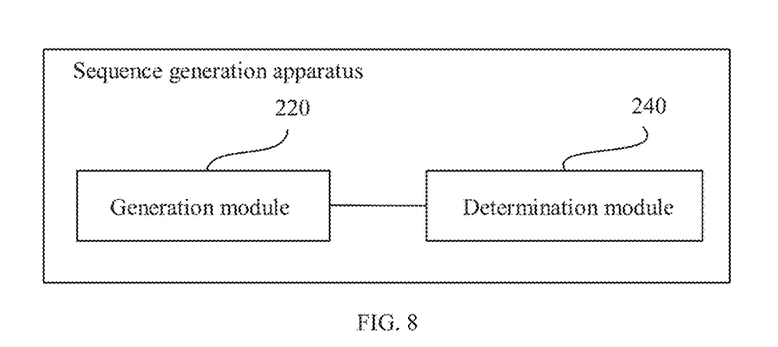
FIG. 8 is a structural diagram of a sequence generation apparatus according to an embodiment of the present disclosure.

FIG. 8 is a structural diagram of a sequence generation apparatus according to an embodiment of the present disclosure. As shown in FIG. 8, the sequence generation apparatus provided in the embodiment includes a generation module 220 and a determination module 240.

The generation module 220 is configured to generate a first sequence according to a pre-generated random sequence. The determination module 240 is configured to use the first sequence as a reference signal sequence. A plurality of elements in the first sequence are all in the form of complex numbers and have the same modulus value, a phase difference between any two adjacent elements is less than π/2, and the modulus value is an amplitude value used to indicate signal strength.

The sequence generation module provided in the embodiment is configured to implement the sequence generation method in the embodiment shown in FIG. 1. An implementation principle and technical effects of the sequence generation apparatus provided in the embodiment are similar to those of the sequence generation method and will not be repeated here.

In an embodiment, the phase difference between a first element and a last element in the first sequence is less than π/2.

In an embodiment, the phase difference between any two adjacent elements in the first sequence is π/4 or smaller.

In an embodiment, the phase difference between the first element and the last element in the first sequence is π/4 or smaller.

In an embodiment, the first sequence includes an odd bit sequence and an even bit sequence.

The phase difference between any two adjacent elements in the odd bit sequence is π/2, and the phase difference between any two adjacent elements in the even bit sequence is π/2 or 0.

In an embodiment, the odd bit sequence is a ½π Binary Phase Shift Keying (BPSK) sequence.

In an embodiment, in a case where a current element is included in a first element set, a phase average of two elements adjacent to the current element is used as a phase of the current element. The first element set includes all elements other than a last element in the even bit sequence.

In an embodiment, a phase average of a penultimate element and the first element in the first sequence is used as the phase of the last element in the even bit sequence.

In an embodiment, in a case where the current element is included in a second element set, if a phase of a previous odd bit element adjacent to the current element is ¾π, the phase of the current element is adjusted as π. The second element set includes all elements having a phase of 0 in the even bit sequence.

In an embodiment, each element in the first sequence has a modulus value of 1.

In an embodiment, the phase of each element in the first sequence includes −¾π, −½π, −¼π, 0, ¼π, ½π, ¾π or π.

In an embodiment, a way of determining the phase of each element in the even bit sequence includes: obtaining the phase of the current element by rotating a previous odd bit element adjacent to the current element by ¼π or −¼π, the phase of the current element satisfying that the phase difference between the current element and a next odd bit element adjacent to the current element is ¼π.

In an embodiment, the generating a first sequence according to a pre-generated random sequence includes:

a relation between the first sequence d(n) and the random sequence b(m) is:

$$d(n) = \frac{\exp\left(j\frac{\pi}{2}(i\bmod 2)\right)}{\sqrt{2}}[(1-2b(i))+j(1-2b(i))]^*$$

$$\exp\left(j\frac{\pi}{4}((n+1)\bmod 2)(2eq(b(i),b(i+1))-1)(1-2(i\bmod 2))\right)$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 when a and b are equal and a result of 0 when a and b are not equal.

In an embodiment, the generation module includes: a first generation unit, a second generation unit and a third generation unit.

The first generation unit is configured to generate an odd bit sequence according to the pre-generated random sequence. The second generation unit is configured to generate an even bit sequence according to the odd bit sequence. The third generation unit is configured to generate the first sequence according to the odd bit sequence and the even bit sequence.

In an embodiment, the first generation unit includes: a relation between the odd bit sequence $d1(m)$ and the random sequence b(m) is:

$$d1(m) = \frac{e^{j\frac{\pi}{2}(m\bmod 2)}}{\sqrt{2}}[(1-2b(m))+j(1-2b(m))],$$

where m=1, 2, 3, . . . , M, mod is a mod function, and i denotes an imaginary part of a complex number.

In an embodiment, the second generation unit includes: a modulus value of each element in the even bit sequence is the same as that of each element in the odd bit sequence; and, a phase of a current element in the even bit sequence is a phase average of two elements adjacent to the current element in the odd bit sequence.

In an embodiment, the third generation unit is further configured sequentially interpolate one element, that is sequentially arranged in the even bit sequence, between two adjacent elements in the odd bit sequence.

In an embodiment, the random sequence is a pseudorandom PN sequence, a Gold sequence or an m sequence.

In an embodiment, the reference signal sequence includes a Demodulation Reference Signal (DMRS) sequence, a Phase-Tracking Reference Signal (PTRS) sequence or a Sounding Reference Signal (SRS) sequence.

In an embodiment, the sequence generation apparatus is further configured to use the first sequence as a Guard Interval (GI) sequence.

In an embodiment, in a case where the reference signal sequence is a DMRS sequence, the sequence generation apparatus further includes: a first transform module configured to perform discrete Fourier transform on the first sequence to obtain a DMRS frequency-domain sequence.

In an embodiment, in a case where the reference signal sequence is an SRS sequence, the sequence generation apparatus further includes: a second transform module configured to perform discrete Fourier transform on the first sequence to obtain an SRS frequency-domain sequence.

In an embodiment, the using the first sequence as a GI sequence includes: placing the first sequence at a front end of an OFDM symbol before one OFT of DFT-s-OFDM to serve as the GI sequence.

Figure 9:
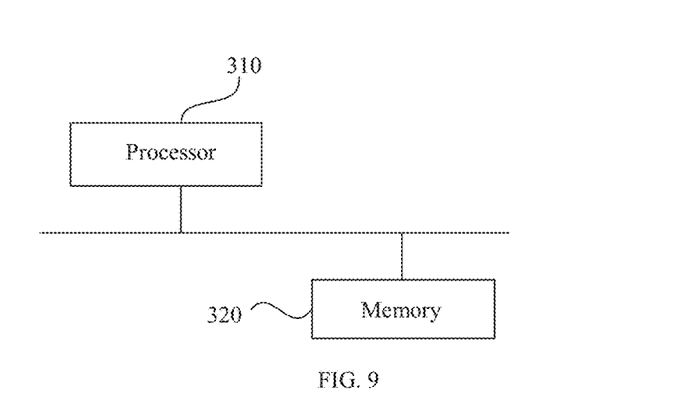
FIG. 9 is a schematic structural diagram of a device according to an embodiment of the present disclosure.

FIG. 9 is a schematic structural diagram of a device according to an embodiment of the present disclosure. As shown in FIG. 9, the device provided by the present disclosure includes a processor 310 and a memory 320. The device may have one or more processors 310, and FIG. 9 is illustrated by taking one processor 310 as an example. The device may one or more memories 320, and FIG. 9 is illustrated by taking one processor 320 as an example. The processor 310 and the memory 320 in the device may be connected via a bus or in other ways. FIG. 9 is illustrated by taking the processor 310 and the memory 320 being connected via a bus as an example. In the embodiment, the device is a base station.

As a computer-readable storage medium, the memory 320 may be configured to store software programs, computer-executable programs and modules, for example, program instructions/modules corresponding to the device according to any one of the embodiments of the present disclosure (for example, the generation module and the determination module in the sequence generation apparatus). The memory 320 may include a program storage region and a data storage region. The program storage region may store application programs required by an operating system and at least one function. The data storage region may store data created according to the use of the device, etc. In addition, the memory 320 may include high-speed random-access memories, or may include non-volatile memories, for example, at least one magnetic disk memory device, a flash memory device or other non-volatile solid-state memory devices. In some instances, the memory 320 may include memories remotely arranged relative to the processor 310. These remote memories may be connected to the device via a network.

Examples of the network include, but not limited to, Internet, Intranet, local area networks, mobile communication networks and combinations thereof.

The device mentioned above may be configured to execute the sequence generation method according any one of the above embodiments, and has the corresponding functions and effects.

An embodiment of the present disclosure further provides a non-transitory computer-readable storage medium, storing computer-executable instructions which, when executed by a processor, cause the processor to carry out a sequence generation method. The method is applied on a base station side. The method includes: generating a first sequence according to a pre-generated random sequence; and, using the first sequence as a reference signal sequence. A plurality of elements in the first sequence are all in the form of complex numbers and have the same modulus value, a phase difference between any two adjacent elements is less than π/2, and the modulus value is an amplitude value used to indicate signal strength.

The term "user equipment" encompasses any suitable type of wireless user equipment, for example, mobile phones, portable data processing apparatuses, portable web browsers or vehicle-mourned mobile stations.

Generally, various embodiments of the present disclosure may be implemented in hardware or dedicated circuits, software, logics or any combinations thereof. For example, some aspects may be implemented in hardware, while other aspects may be implemented in firmware or software that can be executed by a controller, a microprocessor or other computing apparatuses, although the present disclosure is not limited thereto.

The embodiments of the present disclosure may be implemented by executing computer program instructions by a data processor of a mobile device, for example, in processor entities, or by hardware, or by a combination of software and hardware. The computer program instructions may be assembly instructions, Instruction Set Architecture (ISA) instructions, machine instructions, machine-related instructions, microcodes, firmware instructions, state setting data, or source codes or target codes written in any combination of one or more programming languages.

The blocks of any logic flow in the accompanying drawings of the present disclosure may indicate program steps, or may indicate interconnected logic circuits, modules and functions, or may indicate combinations of program steps and logic circuits, modules or functions. The computer programs may be stored on a memory. The memory may be of any type suitable for the local technical environment and may be implemented by any suitable data storage technology, for example, but not limited to, read-only memories (ROMs), random access memories (RAMs), optical memory devices and systems (digital video discs (DVDs) or compact disks (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field-programmable gate arrays (FGPAs), and processors based on a multicore processor architecture.

The invention claimed is:

1. A sequence generation method, comprising:
generating a first sequence according to a pre-generated random sequence; and
using the first sequence as a reference signal sequence;
wherein the first sequence has a plurality of elements which are all in a form of complex numbers and have a same modulus value, a phase difference between two adjacent elements is less than $\pi/2$, and the modulus value is an amplitude value indicating signal strength.

2. The method of claim 1, wherein the phase difference between a first element and a last element in the first sequence is less than $\pi/2$.

3. The method of claim 1, wherein the phase difference between two adjacent elements in the first sequence is $\pi/4$ or smaller.

4. The method of claim 2, wherein the phase difference between the first element and the last element in the first sequence is $\pi/4$ or smaller.

5. The method of claim 1, wherein the first sequence comprises an odd bit sequence and an even bit sequence; and
the phase difference between two adjacent elements in the odd bit sequence is $\pi/2$, and the phase difference between two adjacent elements in the even bit sequence is $\pi/2$ or 0.

6. The method of claim 5, wherein the odd bit sequence is a $\pi/2$ Binary Phase Shift Keying (BPSK) sequence.

7. The method of claim 5, further comprising:
in response to a current element being included in a first element set, using a phase average of two elements adjacent to the current element in the first sequence as a phase of the current element, wherein the first element set comprises all elements other than a last element in the even bit sequence.

8. The method of claim 5, further comprising:
using a phase average of a penultimate element and the first element in the first sequence as the phase of the last element in the even bit sequence.

9. The method of claim 5, further comprising:
in response to the current element being included in a second element set and a phase of a previous odd bit element adjacent to the current element being $\pi/4$, adjusting the phase of the current element as $\pi$, wherein the second element set comprises all elements having a phase of 0 in the even bit sequence.

10. The method of claim 1, wherein each element in the first sequence has a modulus value of 1.

11. The method of claim 1, wherein the phase of each element in the first sequence comprises $3\pi/4$, $\pi/2$, $\pi/4$, 0, $\pi/4$, $\pi/2$, $3\pi/4$ or T.

12. The method of claim 5, wherein a way of determining the phase of each element in the even bit sequence comprises:
obtaining the phase of the current element by rotating a previous odd bit element adjacent to the current element by $\pi/4$ or $-\pi/4$, the phase of the current element satisfying that the phase difference between the current element and a next odd bit element adjacent to the current element is $\pi/4$.

13. The method of claim 1, wherein the generating a first sequence according to a pre-generated random sequence comprises:
a relation between the first sequence d(n) and the random sequence b(m) is:

$$d(n) = \frac{\exp\left(j\frac{\pi}{2}(i\bmod 2)\right)}{\sqrt{2}}[(1-2b(i)) + j(1-2b(i))]^*$$

$$\exp\left(j\frac{\pi}{4}((n+1)\bmod 2)(2eq(b(i), b(i+1)) - 1)(1 - 2(i\bmod 2))\right);$$

where $i = \text{floor}\left(\frac{n+1}{2}\right)$, $m = 1, 2, 3, \cdots, M$, $n = 1, 2, 3, \cdots, N$, $N = 2M$, exp is an exponential function with a natural constant e as the base, mod is a mod function, j denotes an imaginary part of a complex number, eq(a, b) is an equality determination function, and eq(a, b) has a result of 1 in response to a and b being equal and a result of 0 in response to a and b being not equal.

14. The method of claim 1, wherein the generating a first sequence according to a pre-generated random sequence comprises:
generating an odd bit sequence according to the pre-generated random sequence;
generating an even bit sequence according to the odd bit sequence; and
generating the first sequence according to the odd bit sequence and the even bit sequence.

15. The method of claim 14, wherein the generating a first sequence according to a pre-generated random sequence comprises:
a relation between the odd bit sequence d1(m) and the random sequence b(m) is:

$$d1(m) = \frac{e^{j\frac{\pi}{2}(m\bmod 2)}}{\sqrt{2}}[(1-2b(m)) + j(1-2b(m))];$$

where m=1, 2, 3, ..., M, mod is a mod function, and j denotes an imaginary part of a complex number.

16. The method of claim 15, wherein the generating an even bit sequence according to the odd bit sequence comprises:

the modulus value of each element in the even bit sequence is the same as that of each element in the odd bit sequence; and the phase of a current element in the even bit sequence is a phase average of two elements adjacent to the current element in the odd bit sequence.

17. The method of claim 1, wherein the random sequence comprises a Pseudo Noise (PN) sequence, a Gold sequence or an m sequence.

18. The method of claim 1, wherein the reference signal sequence comprises a Demodulation Reference Signal (DMRS) sequence, a Phase-Tracking Reference Signal (PTRS) sequence or a Sounding Reference Signal (SRS) sequence.

19. The method of claim 1, further comprising:

using the first sequence as a Guard Interval (GI) sequence.

20. A non-transitory computer-readable storage medium having computer programs stored thereon which, when executed by a processor, cause the processor to carry out a sequence generation method comprising:

generating a first sequence according to a pre-generated random sequence; and using the first sequence as a reference signal sequence;

wherein the first sequence has a plurality of elements which are all in a form of complex numbers and have a same modulus value, a phase difference between two adjacent elements is less than $\pi/2$, and the modulus value is an amplitude value indicating signal strength.

* * * * *

UNITED STATES PATENT AND TRADEMARK OFFICE
CERTIFICATE OF CORRECTION

PATENT NO. : 12,273,288 B2
APPLICATION NO. : 17/641944
DATED : April 8, 2025
INVENTOR(S) : Jian Hua et al.

It is certified that error appears in the above-identified patent and that said Letters Patent is hereby corrected as shown below:

In the Claims

At Column 14, Lines 10-11, the text:
"and a phase of a previous odd bit element adjacent to the current element being $\pi/4$,"
Should read:
--and a phase of a previous odd bit element adjacent to the current element being $3\pi/4$,--

At Column 14, Lines 16-18, the text:
"The method of claim 1, wherein the phase of each element in the first sequence comprises $3\pi/4$, $\pi/2$, $\pi/4$, 0, $\pi/4$, $\pi/2$, $3\pi/4$ or T."
Should read:
--The method of claim 1, wherein the phase of each element in the first sequence comprises $-3\pi/4$, $-\pi/2$, $-\pi/4$, 0, $\pi/4$, $\pi/2$, $3\pi/4$ or $\pi$.--

At Column 14, Lines 31-40, the text:
"a relation between the first sequence d(n) and the random sequence b(m) is:

$$d(n) = \frac{\exp\left(j\frac{\pi}{2}(i \bmod 2)\right)}{\sqrt{2}} [(1 - 2b(i)) + j(1 - 2b(i))]^*$$

$$\exp\left(j\frac{\pi}{4}((n+1)\bmod 2)(2xq(b(i), b(i+1)) - 1)(1 - 2(i \bmod 2))\right);"$$

Should read:
--a relation between the first sequence d(n) and the random sequence b(m) is:

Signed and Sealed this
Twentieth Day of May, 2025

Coke Morgan Stewart
*Acting Director of the United States Patent and Trademark Office*

$$d(n) = \frac{\exp\left(j\frac{\pi}{2}(i \bmod 2)\right)}{\sqrt{2}}[(1-2b(i)) + j(1-2b(i))]$$
$$* \exp\left(j\frac{\pi}{4}((n+1) \bmod 2)(2eq(b(i),b(i+1))-1)(1-2(i \bmod 2))\right)\text{--}$$

At Column 14, Lines 60-61, the text:
"a relation between the odd bit sequence d1($m$) and the random sequence b(m) is:"
Should read:
--a relation between the odd bit sequence d1(m) and the random sequence b(m) is:--